United States Patent [19]

Funato et al.

[11] 4,355,858

[45] Oct. 26, 1982

[54] HOLOGRAM LENS

[75] Inventors: Hiroyoshi Funato, Chigasaki; Yoshio Fukushima, Machida, both of Japan

[73] Assignee: Ricoh Company, Ltd., Tokyo, Japan

[21] Appl. No.: 77,943

[22] Filed: Sep. 24, 1979

[30] Foreign Application Priority Data

Sep. 28, 1978 [JP] Japan ................................ 53-119457

[51] Int. Cl.³ .............................................. G02B 5/32
[52] U.S. Cl. ..................................... 350/3.72; 350/3.80
[58] Field of Search ................... 350/3.70, 3.72, 3.73, 350/3.80

[56] References Cited

U.S. PATENT DOCUMENTS

| 4,054,356 | 10/1977 | Noguchi | 350/3.72 |
| 4,133,600 | 1/1979 | Russell et al. | 350/3.72 |
| 4,306,763 | 12/1981 | Huignard | 350/3.72 |

OTHER PUBLICATIONS

Sincerbox, "Formation of Optical Elements by Holography", *IBM Tech. Discl. Bull.*, vol. 10, No. 3, Aug. 1967, pp. 267-268.
Bykovskii et al., "Coherence of the Radiation Emitted by . . . ", *Sov. Phys. Semiconductors*, vol. 4, No. 5, Nov. 1970, pp. 819-821.
Minami et al., "Holographic Image Reconstruction With . . . ", *Applied Optics*, vol. 10, No. 7, Jul. 1971, pp. 1629-1631.
Richter et al., "Holographically Generated Lens", *Applied Optics*, vol. 13, No. 12, Dec. 1974, pp. 2924-2930.

*Primary Examiner*—John D. Lee
*Attorney, Agent, or Firm*—Wyatt, Gerber, Shoup, Scobey & Badie

[57] ABSTRACT

A hologram lens capable of converting an output beam of light emitted from a semiconductor to a reconstruction light suitable for reconstructing holograms is prepared by use of the object light, which resembles a beam of light emitted divergently from a semiconductor laser for reconstructing holograms and which travels, in the opposite direction to the travelling direction of the beam of light from the semiconductor laser, in such a manner as to converge on a light emitting portion of the semiconductor laser, and the reference light which is an isotropic beam with a circular cross section. The object light is obtained by use of an optical system capable of converting an output beam emitted from semiconductor lasers to an isotropic beam of light with a circular cross section when the output beam of light is caused to pass through the optical system from its input side Lin to its output side Lout, and by causing an isotropic beam of light with a circular cross section to pass through the optical system from the output side Lout to the input side Lin.

2 Claims, 10 Drawing Figures

HOLOGRAM LENS

BACKGROUND OF THE INVENTION

The present invention relates to a hologram lens capable of converting the characteristic of a beam from semiconductor lasers used as light sources for reconstructing holograms, from an aeolotropic characteristic to an isotropic characteristic.

Conventionally, when semiconductor lasers are used as light sources for reconstructing holograms, the output beam of the semiconductor laser is converted into an isotropic beam through a special optical system, without using the output beam of semiconductor lasers as it is, since the output beam of semiconductor lasers has an aeolotropic characteristic, and the holograms are reconstructed using the thus isotropically converted beam of semiconductor lasers.

In order to convert the aeolotropic beam of semiconductor lasers to an isotropic beam, optical systems comprising a plurality of noncoherent image formation elements, such as cylindrical lenses, are in general use. However, the conventional optical systems for use in the hologram reconstruction apparatus using semiconductor lasers are complicated in the mechanism and so long as the conventional optical systems are used, reduction of the size and cost of the hologram reconstruction apparatus is limited.

The outline of the conventional technique relating to the present invention will now be explained.

Semiconductor lasers are watched with interest in the sense that semiconductor lasers are of a small size and their power consumption is much less in comparison with gas lasers so that the semiconductor lasers contribute to the reduction of the size and cost of hologram reconstruction apparatus using the semiconductor lasers as light sources.

Referring to FIG. 1, there is diagrammatically shown a GaAs semiconductor laser as an example of a semiconductor laser. As shown in FIG. 1, the light emission area of a semiconductor laser 1 is a GaAs crystal portion held between a p-type GaAlAs layer 2 and a n-type GaAlAs layer 3. In the GaAs crystal portion, a portion in the conjunction direction, namely X—X direction, defined by a strip electrode 4, constitutes a light emitting portion 5. The area of the light emitting portion 5 is normally about $0.3\mu \times 10\mu$.

The light emitting portion 5 is so small that a beam 6 emitted from the semiconductor laser 1 tends to diverge due to diffraction. In this case, since the light emitting portion 5 is rectangular and one side of the light emitting portion 5 in the X—X direction and the other side thereof in the Y—Y direction are different in length, the expansion angle of the beam 6 in the X—X direction and that in the Y—Y direction are different as illustrated in FIG. 1. The X—X direction is normal to the Y—Y direction, and in FIG. 1 the Y—Y direction is vertical and the X—X direction is horizontal.

As shown in FIG. 1, the cross section of the beam 6 is elliptical, and the distribution of light intensity of the beam 6 is aeolotropic, which is more specifically shown in FIGS. 2 and 3.

Generally, the semiconductor lasers have advantages of being small in size and low in cost. However, as mentioned above, unlike the distribution of the light intensity of the output beam from gas lasers, the distribution of the light intensity of the output beam of the semiconductor lasers is aeolotropic and such aeolotropic distribution of the light intensity of the beam becomes a problem when the reconstruction of holograms is performed using the semiconductor lasers. This is because holograms are usually prepared by gas lasers, such as an He-Ne lasers and, as a reference light, an isotropic beam, formed by parallel light, convergent pencil of rays, and divergent pencil of rays, are employed. Therefore, when the recorded holograms are reconstructed to obtain images therefrom, the reconstruction beam has to have the same isotropic characteristic as that of the reference light which is used when recording. Therefore, it is not suitable to use the output beam from the semiconductor laser as it is, as the reconstruction beam, since the output beam from the semiconductor lasers is not isotropic. For this reason, the output beam from the semiconductor lasers has to be converted into an isotropic beam by some means when it is used as the reconstruction beam.

Conventionally, optical systems comprising a plurality of cylindrical lenses are used to perform the above-mentioned conversion. FIGS. 4 and 5 schematically show an example of such an optical system. In FIGS. 4 and 5, the aeolotropic beam 6 with an elliptical cross section, which is emitted from the semiconductor laser 1, is converted into a parallel beam 9 having a circular cross section and an isotropic property.

The beam 6 emitted in the divergent state from the semiconductor laser 1 is converted to a parallel beam by a lens $L_1$ of the optical system 8 and then enters a cylindrical lens $L_2$ and a cylindrical lens $L_3$ successively. The cylindrical lenses $L_2$ and $L_3$ have a different convergent power, respectively, and the direction of the convergent power of one lens is set so as to be normal to the direction of the convergent power of the other lens and the respective directions are in conformity with the above-mentioned X—X direction and Y—Y direction. By the difference of the convergent power between the two lenses $L_2$ and $L_3$, the aeolotropic beam is converted into an isotropic beam, namely a parallel beam in the present case.

To sum up, the optical system 8 converts the divergent and aeolotropic beam 6, which enters from an input side Lin, to an isotropic beam 9 and emits the isotropic beam 9 from an output side Lout thereof.

It is possible to use the semiconductor laser 1 as a light source for reconstructing holograms by use of the above-mentioned optical system 8. However, the optical system 8 is complicated in construction and takes up too much space for use with hologram reconstruction apparatus and accordingly so long as the conventional optical system 8 or the like is used, there is a limit to reduce the size and cost of the hologram reconstruction apparatus.

SUMMARY OF THE INVENTION

It is therefore an object of the present invention to provide a hologram lens capable of converting an output beam of light emitted from semiconductor lasers to a reconstruction light suitable for reconstructing holograms to obtain visible images therefrom.

Another object of the present invention is to provide a hologram lens which is small in the size and low in the cost and whose performance is equivalent to or better than a conventional optical system for converting an output beam of light emitted from semiconductor lasers to a reconstruction light for reconstructing holograms.

In preparing a hologram lens according to the invention, as the object light is used a beam of light, which resembles a beam of light emitted divergently from a semiconductor laser for reconstructing holograms and which travels in the opposite direction to the travelling direction of the beam of light from the semiconductor laser, in such a manner as to converge on a light emitting portion of the semiconductor laser, and as the reference light is used an isotropic beam of light, whose cross section is circular, and the object light is obtained by use of an optical system capable of converting an output beam from semiconductor lasers to an isotropic beam of light with a circular cross section when the output beam of light is caused to pass through the optical system from its input side Lin to its output side Lout, and by causing an isotropic beam of light with a circular cross section to pass through the optical system from the output side Lout to the input side Lin.

DETAILED DSCRIPTION OF THE PREFERRED EMBODIMENT

Figure 5:
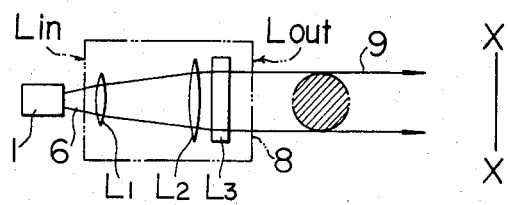
FIG. 5 is a schematic plan view of FIG. 4.
Figure 6:
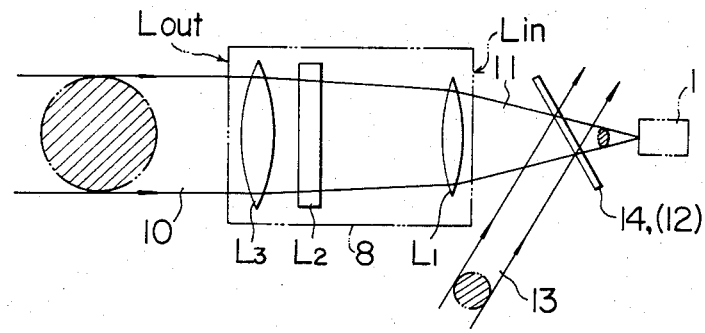
FIG. 6 is a schematic drawing for explaining a method of preparing a hologram lens according to the invention.

In preparing a hologram lens according to the invention, the previously mentioned optical system 8 is used in such a manner as to cause a beam to travel in the opposite direction to the conventional travelling direction of a beam through the optical system 8. Referring to FIG. 6, there is diagrammatically shown the optical system arranged in a suitable manner for the invention. The optical system is the same as the optical system 8 in FIGS. 4 and 5, so that with respect to the same members as those of the optical system 8, the same reference numerals and symbols are used in FIG. 6.

Figure 4:
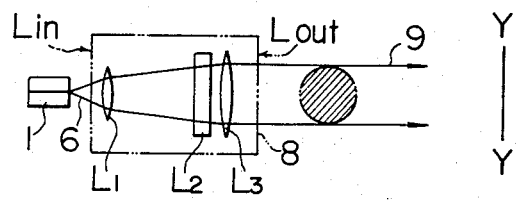
FIG. 4 is a schematic side view of an optical system and a semiconductor laser, which is to illustrate the construction of the optical system for converting an output beam emitted from the semiconductor laser to an isotropic parallel beam of light and to explain the relationship between the optical system and the semiconductor laser.

In FIG. 6, reference numeral 10 represents an isotropic circular beam. As the isotropic circular beam 10, an output beam emitted from gas lasers can be used as it is or a beam of light obtained by converting the output beam emitted from the semiconductor laser, using the optical system 8 as shown in FIGS. 4 and 5, can be used as well.

The isotropic circular beam 10 is caused to enter the output side Lout of the optical system 8. Supposing that the characteristics of the isotropic circular beam 10 are the same as those of the previously mentioned beam 9, it follows that a beam 11 emitted from the input side of the optical system in FIG. 6 resembles the beam 6 emitted divergently from the semiconductor laser 1, except that the travelling direction of the beam 11 is opposite to that of the beam 6, so that the beam 11 travels toward the light emitting portion of an illusory semiconductor laser (1) indicated by the alternate long and two short dash line in FIG. 6. In other words, the beam 11 has the same characteristics as those of the beam 6, except that the travelling direction of the beam 11 is opposite to that of the beam 6.

In a hologram lens 14 according to the invention, the beam 11 is used as object light, and in the optical path of the object light, there is disposed a photosensitive member 12 which is used as a material for preparing a hologram lens 14, and in conformity with the surface of the photosensitive member 12 to be illuminated by the beam 11, an isotropic parallel reference light 13, which is circular in the cross section thereof, is caused to strike the surface of the photosensitive member 12 to perform hologram recording.

The reconstruction of holograms using the hologram lens 14 will now be explained.

Figure 7:
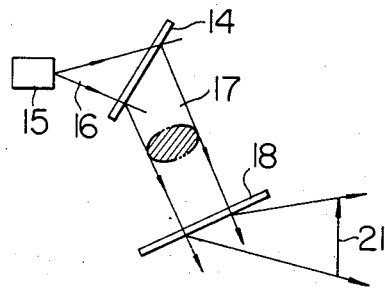
FIG. 7 is a schematic drawing for explaining a method of reconstructing a hologram by use of a hologram lens according to the invention.
Figure 10:
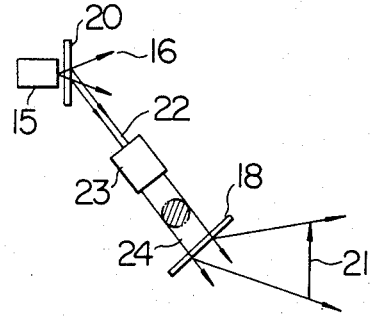
FIG. 10 is a schematic drawing for explaining a suitable method for reconstructing a hologram by use of the hologram lens prepared by the method as shown in FIG. 9.

Referring to FIG. 7, the light emitting portion of a semiconductor laser 15 and the hologram lens 14 are arranged in the same configuration as that of the photosensitive member 12 (the hologram lens 14) and the light emitting portion of the illusory semiconductor laser (1) in FIG. 6. The beam 16, whic is emitted from the semiconductor laser 15 as the reconstruction light for the hologram lens 14, is in the conjugate relationship with the beam 11. Therefore, an isotropic parallel light 17, which is in the conjugate relationship with the parallel reference light 13, is reconstructed and emitted from the hologram lens 14. By striking the parallel light 17 on a hologram plate 18 which bears a hologram 18a to be reconstructed, a desired reconstructed image 21 can be obtained.

In preparing the hologram lens 14, if the hologram 18a is made in such a manner that a desired image is reconstructed by a divergent light, the hologram lens 14 is prepared using a convergent light which is in the conjugate relationship with the divergent light, as the reference light instead of the parallel reference light 13. Likewise, when the hologram 18a is prepared in such a manner that a desired image is reconstructed by a convergent beam, the hologram lens 14 is prepared using a divergent light which is in the conjugate relationship with the convergent beam, as the reference light.

According to the invention, the conventional optical system 8 can be replaced by the single hologram lens 14 and accordingly the hologram reconstruction apparatus can be made small in size and inexpensive.

In the hologram lens 14 prepared by the optical system as shown in FIG. 6, the contour of the hologram lens portion is an ellipse. This is because the photosensitive member 12 is not positioned normal to the optical axes of the beam 11 and the parallel reference light 13, but slants with respect to the optical axes, and the shape of the hologram lens portion is determined by the shape of a portion commonly illuminated by the beam 11 and the parallel reference light 13.

Therefore, the parallel light 17 emitted from the hologram lens 14 shown in FIG. 7 is elliptical in its cross section, unlike the cross section of the parallel reference light 13.

Figure 8:
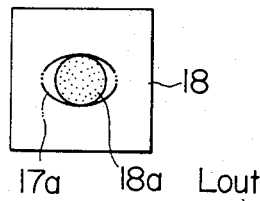
FIG. 8 shows a disagreement between the contour of a reconstruction light illuminated on a hologram plate and the shape of a hologram.

Therefore, when the contour of the hologram 18a recorded on the hologram plate 18 is in conformity with the contour of the parallel light 17, there is no problem. However, as shown in FIG. 8, when the shape of the hologram 18a is circular, gaps are formed between the shape of the hologram 18a and the contour 17a of the parallel light 17 on the hologram plate 18 which is disposed normal to the optical axis of the parallel light 17, so that a portion of light corresponding to the gaps is lost.

In such an event, the cross section of the beam emitted from the hologram lens 14 is made circular in order to eliminate the loss of light.

Figure 9:
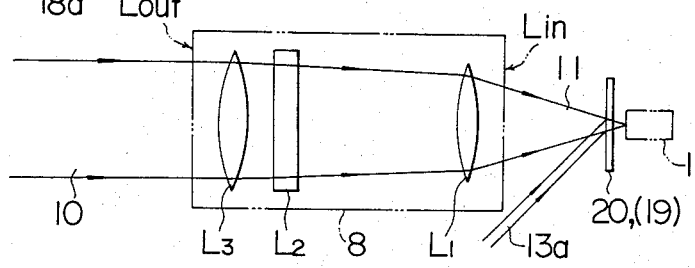
FIG. 9 is a schematic drawing for explaining another method of preparing a hologram lens according to the invention.

Referring to FIG. 9, a method of preparing a hologram lens capable of emitting a construction beam with a circular cross section will now be explained.

Figure 1:
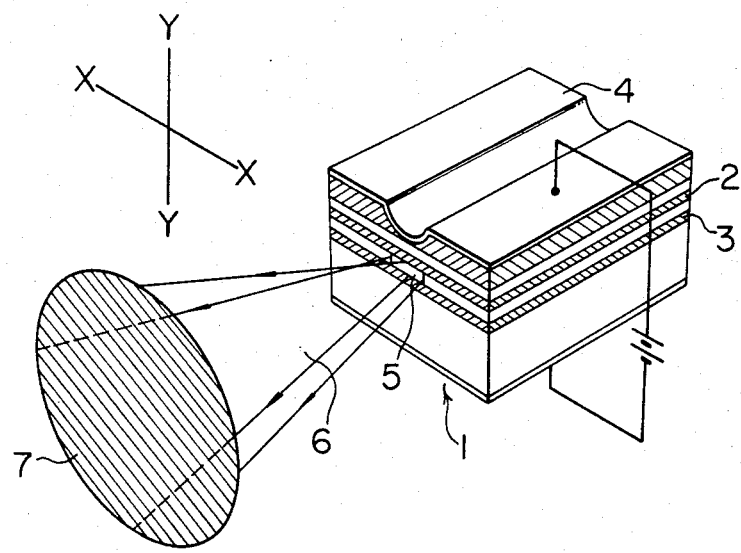
FIG. 1 schematically shows a semiconductor laser and the shape of an output beam of light emitted from the semiconductor laser.
Figure 2:
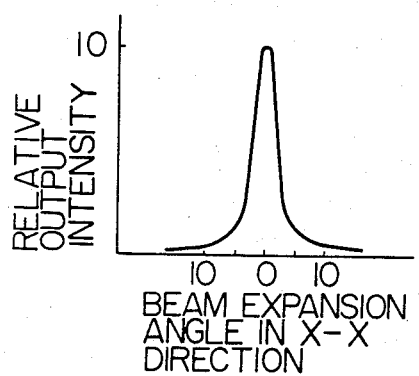
FIG. 2 is a graph showing the expansion of the beam of light emitted from the semiconductor laser of FIG. 1, particularly in the conjunction direction of the semiconductor laser.
Figure 3:
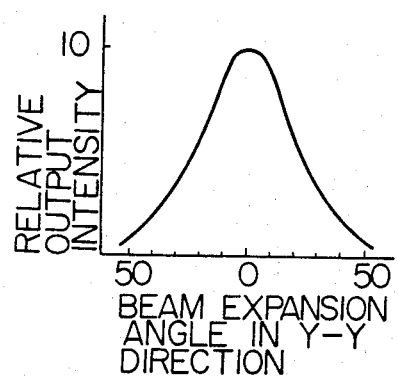
FIG. 3 is a graph showing the expansion of the beam of light emitted from the semiconductor laser of FIG. 1, particularly in the direction normal to the conjunction direction of the semiconductor laser.

The cross section of the beam emitted from the semiconductor laser 1 is elliptical in a place away from the light emitting portion 5 as shown in FIG. 1, since the beam emitted from the conductor laser 1 is divergent. However, in proximity to the light emitting portion 5, the cross section of the beam is almost circular. Utilizing this relationship, a photosensitive member 19 for preparing a hologram lens is placed in proximity to a position on which the beam 11 converges, and the hologram lens is prepared by use of the beam 11 and a parallel reference light 13a. The position on which the beam 11 converge is identical to the position of the light emitting section of the illusory semiconductor laser (1) in FIG. 6. When such a hologram lens is prepared, it is desirable to arrange the photosensitive member 19 so as to be normal as much as possible to each of the optical axes of the beam 11 and the parallel reference light 13a. The thus prepared hologram lens 20 has a lens portion with an approximately circular contour. However, its hologram is very small since the hologram is prepared in close proximity to the position on which the beam 11 converges.

Therefore, when the thus prepared hologram lens 20 is actually used, its beam diameter is too small to reconstruct the desired hologram 18a. In order to eliminate this problem, the diameter of a beam 22 emitted from the hologram lens 20 is expanded by a beam expander 23 so that the hologram 18a is reconstructed using a beam 24 obtained from the beam expander 23, whereby reconstructed image 21 can be obtained without such a loss of light as mentioned above.

What is claimed is:

1. A hologram lens for converting an output beam of light emitted from semiconductor lasers to a reconstruction light suitable for reconstructing holograms, said lens being prepared by:

forming an object beam of light resembling a beam of light emitted divergently from a semiconductor laser for reconstructing holograms but traveling in the direction opposite to that of a beam of light from a semiconductor laser, forming an iostropic reference beam of light having a circular cross section, and directing said object beam of light and said reference beam of light onto a photosensitive member to form an interference pattern thereon, said object beam of light being obtained by using means including an optical system capable of converting an output beam from semiconductor lasers to an isotropic beam of light with a circular cross section when said output beam of light is caused to pass through said optical system from an input side thereof to an output side thereof, said object beam of light being obtained by causing an isotropic beam of light with circular cross section to pass through said optical system from said output side to said input side.

2. A hologram lens as claimed in claim 1, wherein said hologram lens is prepared by arranging said photosensitive member in proximity to a position on which said object beam of light converges.

* * * * *